US009420614B2

(12) United States Patent
Cho et al.

(10) Patent No.: US 9,420,614 B2
(45) Date of Patent: Aug. 16, 2016

(54) METHOD AND APPARATUS FOR ESTABLISHING DEVICE-TO-DEVICE CONNECTION IN WIRELESS COMMUNICATION SYSTEM

(71) Applicant: LG ELECTRONICS INC., Seoul (KR)

(72) Inventors: Heejeong Cho, Anyang-si (KR); Hyeyoung Choi, Anyang-si (KR); Seunghyun Kang, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 36 days.

(21) Appl. No.: 14/384,132

(22) PCT Filed: Feb. 8, 2013

(86) PCT No.: PCT/KR2013/001039
§ 371 (c)(1),
(2) Date: Sep. 9, 2014

(87) PCT Pub. No.: WO2013/141483
PCT Pub. Date: Sep. 26, 2013

(65) Prior Publication Data
US 2015/0056983 A1 Feb. 26, 2015

Related U.S. Application Data

(60) Provisional application No. 61/613,989, filed on Mar. 22, 2012.

(51) Int. Cl.
*H04W 4/00* (2009.01)
*H04W 76/02* (2009.01)
(52) U.S. Cl.
CPC ............ *H04W 76/021* (2013.01); *H04W 4/008* (2013.01); *H04W 76/023* (2013.01)

(58) Field of Classification Search
USPC ....................................................... 455/426.1
See application file for complete search history.

(56) References Cited

U.S. PATENT DOCUMENTS

| 7,239,882 | B1 | 7/2007 | Cook |
| 2009/0016219 | A1 | 1/2009 | Laroia et al. |
| 2009/0232143 | A1* | 9/2009 | Li ..................... H04W 72/1242 370/395.3 |
| 2010/0255869 | A1 | 10/2010 | Sood |
| 2010/0261469 | A1 | 10/2010 | Ribeiro et al. |
| 2011/0317569 | A1 | 12/2011 | Kneckt et al. |

OTHER PUBLICATIONS

PCT International Application No. PCT/KR2013/001039, Written Opinion of the International Searching Authority dated May 30, 2013, 1 page.

* cited by examiner

*Primary Examiner* — Joel Ajayi
(74) *Attorney, Agent, or Firm* — Lee Hong Degerman Kang & Waimey; Jonathan Kang; Jeffrey Lotspeich

(57) ABSTRACT

A method and apparatus for establishing a device-to-device (D2D) connection in a wireless communication system is provided. A first device selects at least one connection identifier (CID) among unused CIDs by the first device and other devices, and transmits a connection establishment request message to a second device. The first device receives a connection establishment response message from the second device. The connection establishment response message includes the D2D peer ID of the first device, the D2D peer ID of the second device, a CID list unused by the second device and a first CID determined by the second device. The first device transmits a connection establishment confirm message including a second CID confirmed by the first device to the second device.

10 Claims, 13 Drawing Sheets

METHOD AND APPARATUS FOR ESTABLISHING DEVICE-TO-DEVICE CONNECTION IN WIRELESS COMMUNICATION SYSTEM

CROSS-REFERENCE TO RELATED APPLICATIONS

This application is the National Stage filing under 35 U.S.C. 371 of International Application No. PCT/KR2013/001039, filed on Feb. 8, 2013, which claims the benefit of U.S. Provisional Application Ser. No. 61/613,989, filed on Mar. 22, 2012, the contents of which are all hereby incorporated by reference herein in their entirety.

BACKGROUND OF THE INVENTION

1. Field of the Invention

The present invention relates to wireless communications, and more particularly, to a method and apparatus for establishing a device-to-device (D2D) connection in a wireless communication system.

2. Related Art

In next generation multimedia mobile communication systems, which have been actively studied in recent years, there is a demand for a system capable of processing and transmitting a variety of information (e.g., video and radio data) in addition to the early-stage voice service. Further, a 3rd generation wireless communication system is followed by a 4th generation wireless communication which is currently being developed aiming at supporting a high-speed data service of 1 gigabits per second (Gbps) in downlink and 500 megabits per second (Mbps) in uplink. The wireless communication system is designed for the purpose of providing reliable communication to a plurality of users irrespective of their locations and mobility. However, a wireless channel has an abnormal characteristic such as a fading phenomenon caused by a path loss, noise, and multipath, an inter-symbol interference (ISI), a Doppler effect caused by mobility of a user equipment, etc. Therefore, various techniques have been developed to overcome the abnormal characteristic of the wireless channel and to increase reliability of wireless communication.

Meanwhile, with the advent of a ubiquitous environment, there is a rapid increase in a demand for receiving a seamless service anytime anywhere by using equipments. In order to satisfy such a demand, a device-to-device (D2D) connection technique may be introduced in a wireless communication system. The D2D connection technique refers to a technique for transmitting and receiving data not via a base station (BS) since devices such as a user equipment (UE) or the like are connected to each other. That is, one device can communicate with another device via the BS, and can directly communicate with another device not via the BS. By using the D2D connection technique, such an effect as low power consumption, throughput enhancement, etc., can be obtained. Proximity communication can be defined as communication between neighbor devices through the D2D connection.

There is a need for a method for effectively establishing a D2D connection between devices to perform proximity communication.

SUMMARY OF THE INVENTION

The present invention provides a method and apparatus for establishing a device-to-device (D2D) connection in a wireless communication system. The present invention provides a method of establishing a D2D connection between devices to perform proximity communication in a wireless communication system. In addition, the present invention provides a method of establishing a D2D connection by a plurality of devices without collision of a connection identifier (CID).

In an aspect, a method for establishing, by a first device, a device-to-device (D2D) connection in a wireless communication system is provided. The method includes selecting at least one connection identifier (CID) among unused CIDs by the first device and other devices, transmitting a connection establishment request message to a second device, the connection establishment request message including the selected at least one CID, a D2D peer ID of the first device, a D2D peer ID of the second device, and a connection type between the first device and the second device, receiving a connection establishment response message from the second device, the connection establishment response message including the D2D peer ID of the first device, the D2D peer ID of the second device, a CID list unused by the second device and a first CID determined by the second device, and transmitting a connection establishment confirm message including a second CID confirmed by the first device to the second device.

In another aspect, a method for establishing, by a first device, a device-to-device (D2D) connection in a wireless communication system is provided. The method includes receiving a connection establishment request message from a second device, the connection establishment request message including at least one connection identifier (CID), selected by the second device, among unused CIDs by the second device and other devices, a D2D peer ID of the first device, a D2D peer ID of the second device, and a connection type between the first device and the second device, determining a first CID based on the at least one CID selected by the second device, the CID list unused by the first device, and CID lists unused by other devices, transmitting a connection establishment response message to the second device, the connection establishment response message including the D2D peer ID of the first device, the D2D peer ID of the second device, a CID list unused by the first device and the first CID, and receiving a connection establishment confirm message including a second CID confirmed by the second device from the second device.

A plurality of devices can effectively establish a D2D connection without collision of a connection identifier (CID).

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

Figure 1:
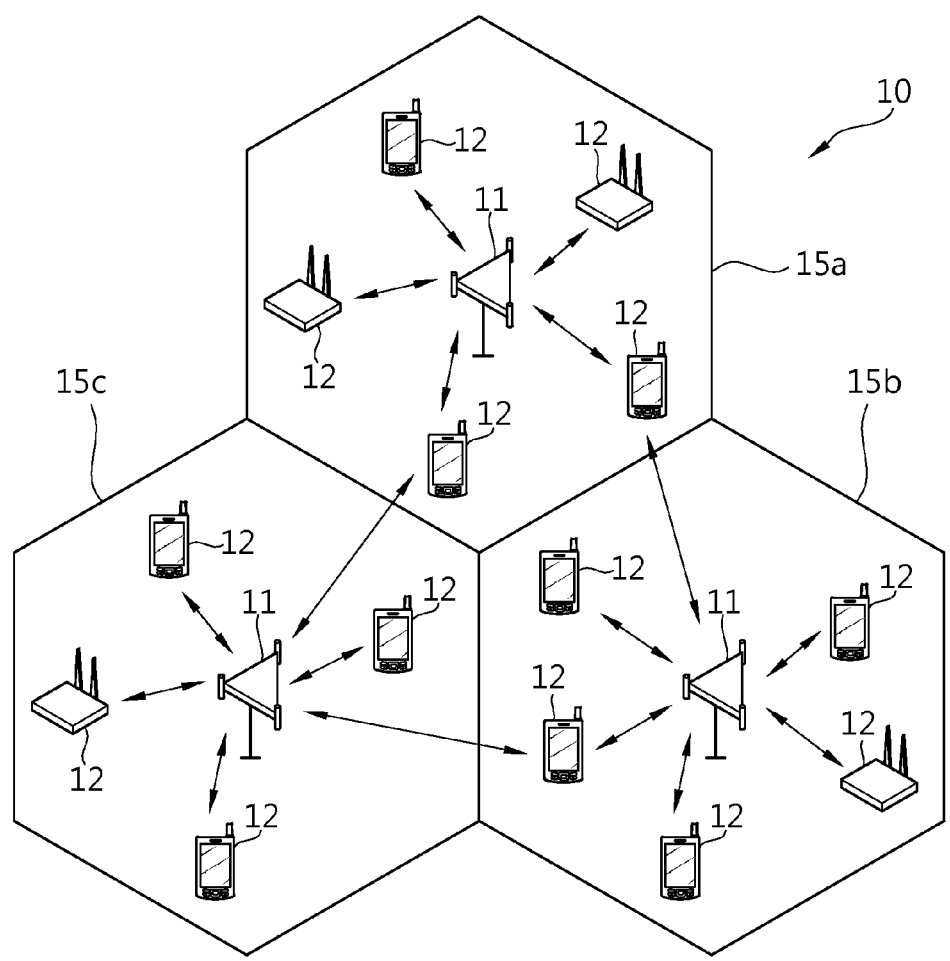
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

When devices are proximate to each other, the devices can perform proximity communication by using a local path or a direct path. A device-to-device (D2D) connection can be defined as a connection directly established between the devices for proximity communication.

Figure 2:
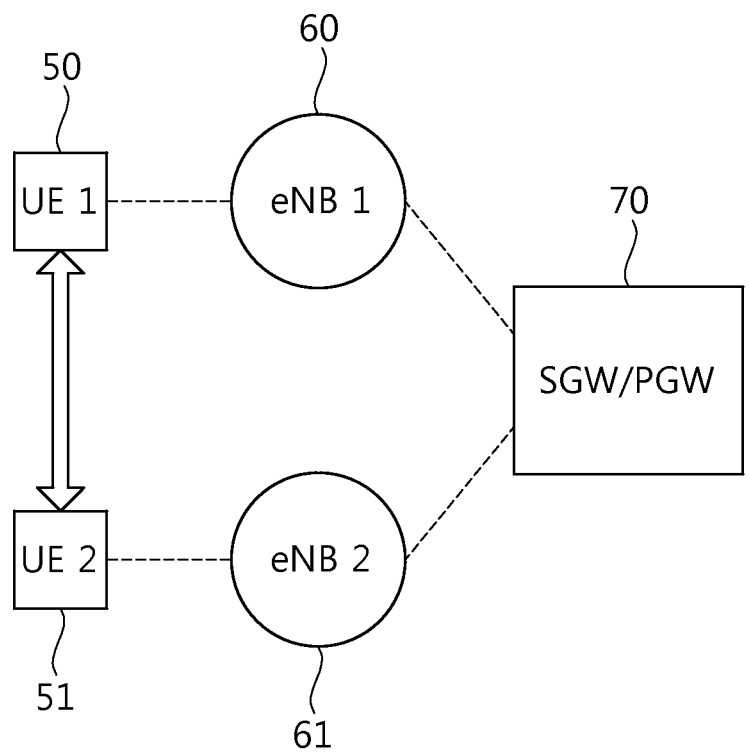
FIG. 2 shows proximity communication performed through a D2D connection in 3GPP LTE.

FIG. 2 shows proximity communication performed through a D2D connection in 3GPP LTE.

Referring to FIG. 2, a wireless communication system includes one or more UEs 50 and 51, one or more eNBs 60 and 61, and a serving gateway (SGW)/packet data network (PDN) gateway (PGW) 70. If the UEs 50 and 51 do not perform proximity communication, the UE1 50 may be served by the eNB1 60 and the UE2 51 may be served by the eNB2 61. If the UEs 50 and 51 intend to perform proximity communication, an operator can move a data path, i.e., a user plane, from a core network (CN) to a direct link of the UEs 50 and 51. Accordingly, a D2D connection is established between the UEs 50 and 51, and the UEs 50 and 51 can perform proximity communication.

Figure 3:
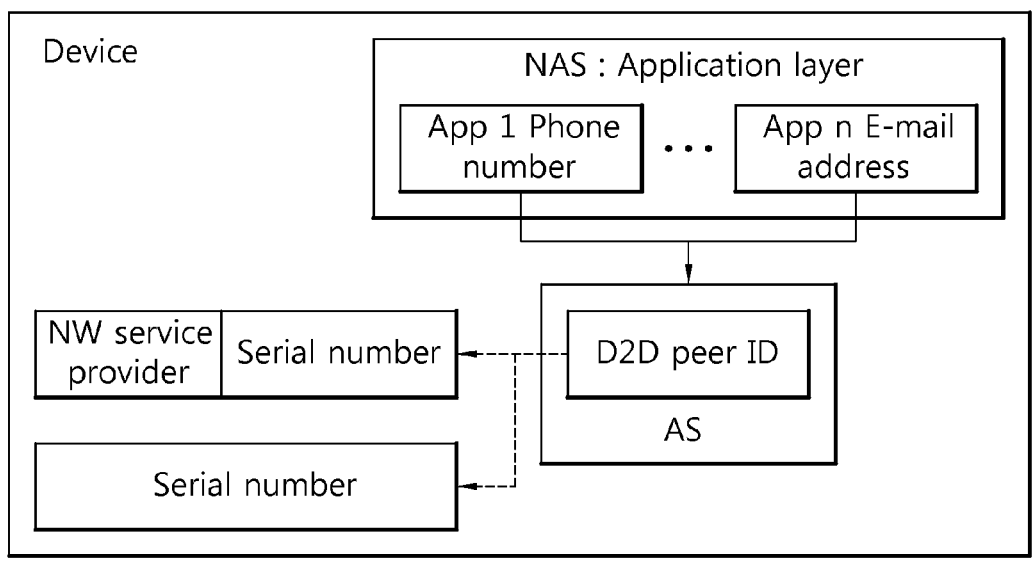
FIG. 3 shows a D2D peer identifier (ID) assigned to a device for performing proximity communication according to an embodiment of the present invention.

FIG. 3 shows a D2D peer identifier (ID) assigned to a device for performing proximity communication according to an embodiment of the present invention.

Referring to FIG. 3, the device may consist of a non-access stratum (NAS) and an access stratum (AS). The NAS represents an application layer. The application layer may include n applications. The n applications may include a phone number, an e-mail address, etc. A D2D peer ID may be assigned to the AS. The D2D peer ID indicates a device identifier assigned to each device for proximity communication. The n applications included in the NAS may be indicated by one D2D peer ID assigned to the AS. The D2D peer ID may be expressed in various forms. For example, the D2D peer ID may include a network service provider and a serial number, or may include only the serial number.

Figure 4:
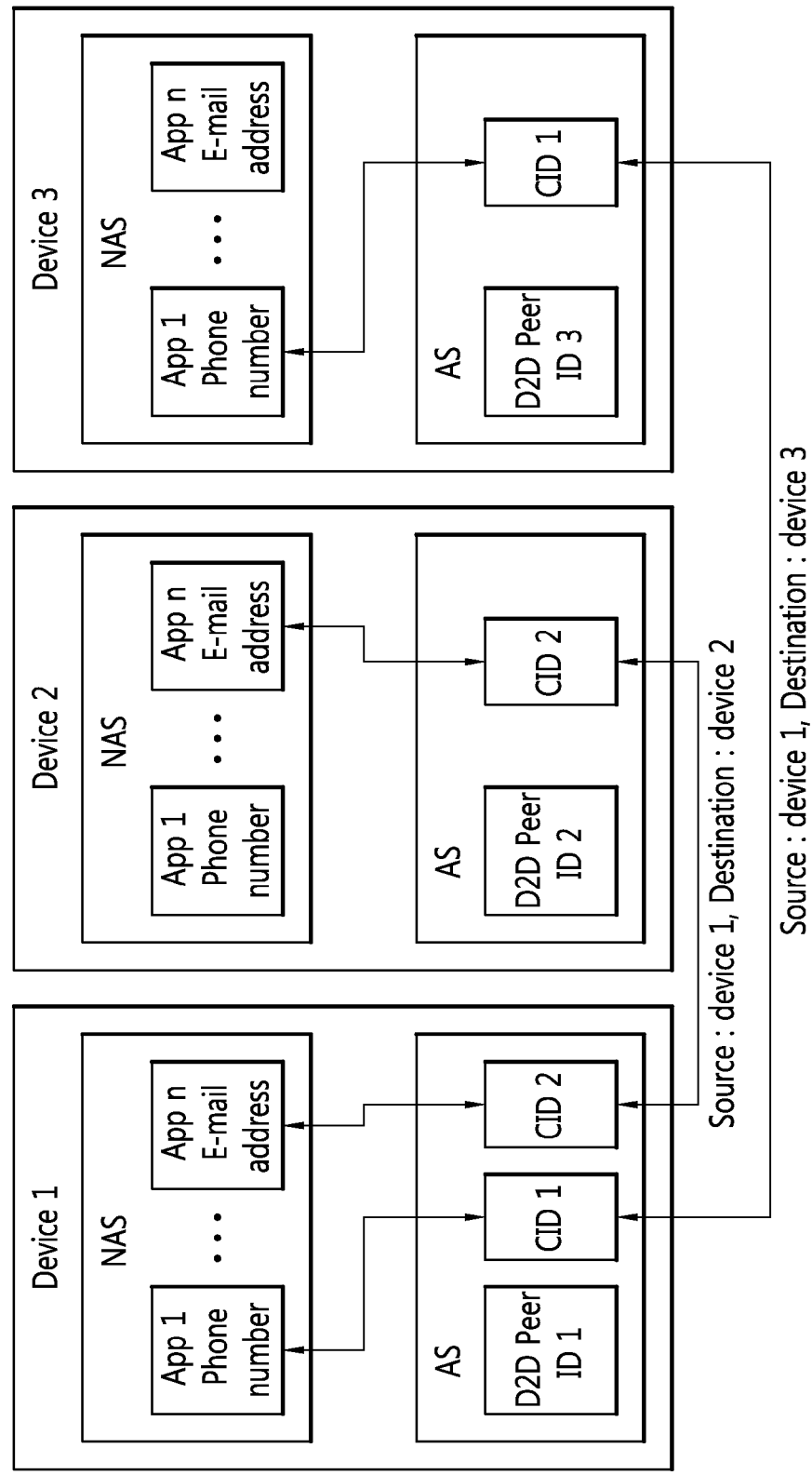
FIG. 4 shows a connection ID (CID) assigned to a connection between applications in a device for performing proximity communication according to an embodiment of the present invention.

FIG. 4 shows a connection ID (CID) assigned to a connection between applications in a device for performing proximity communication according to an embodiment of the present invention.

Referring to FIG. 4, each device may consist of an NAS and an AS. The NAS of each device may include n applications. The n applications may include a phone number, an e-mail address, etc. A D2D peer ID may be assigned to the AS of each device. The n applications included in the NAS of each device may be indicated by one D2D peer ID assigned to the AS of each device. A D2D peer ID 1, a D2D peer ID 2, a D2D peer ID 3 may be respectively assigned to the device 1, the device 2, and the device 3.

The device 1 may request a phone number application to the device 3. Accordingly, the phone number application of the device 1 and the phone number application of the device 3 may be connected to each other. The connection between the phone number application of the device 1 and the phone number application of the device 3 may be indicated by a CID 1. In addition, the device 1 may request a connection of an e-mail address application to the device 2. Accordingly, the e-mail address application of the device 1 and the e-mail address application of the device 2 may be connected to each other. The connection of the e-mail address application of the device 1 and the e-mail address application of the device 2 may be indicated by a CID 2. As such, the CIDs can be assigned one by one to the connections between the applications included in the respective devices.

Figure 5:
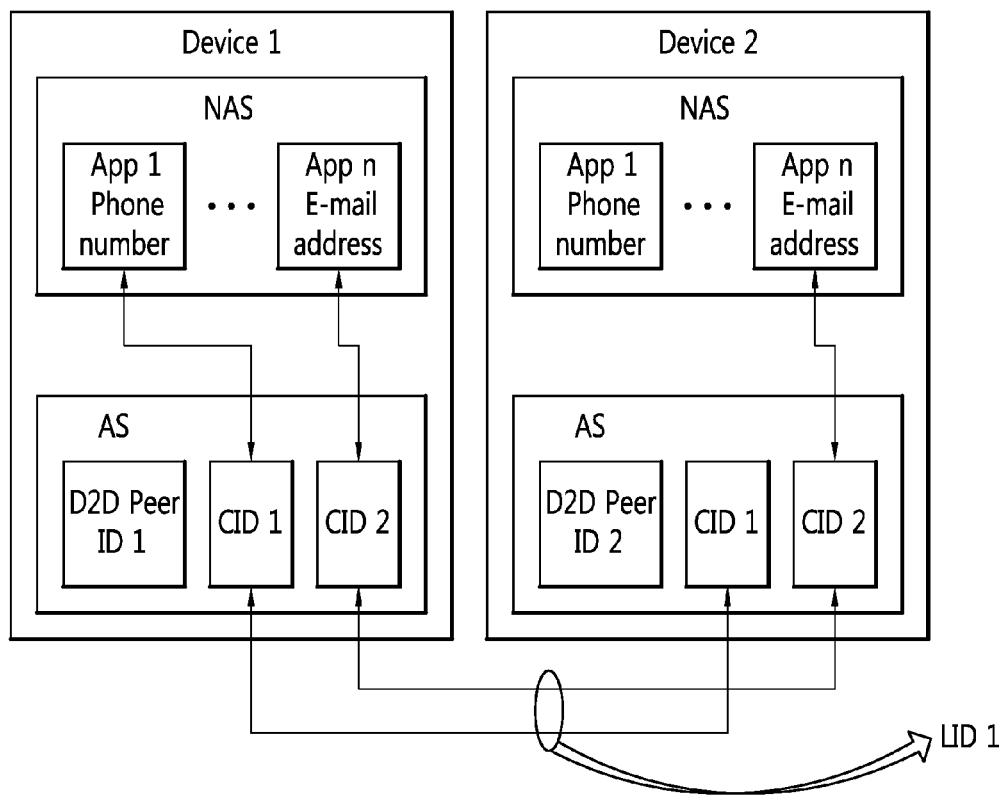
FIG. 5 shows a link ID (LID) assigned to a connection between applications in a device for performing proximity communication according to an embodiment of the present invention.

FIG. 5 shows a link ID (LID) assigned to a connection between applications in a device for performing proximity communication according to an embodiment of the present invention.

Referring to FIG. 5, each device may consist of an NAS and an AS. The NAS of each device may include n applications. The n applications may include a phone number, an e-mail address, etc. A D2D peer ID may be assigned to the AS of each device. The n applications included in the NAS of each device may be indicated by one D2D peer ID assigned to the AS of each device. A D2D peer ID 1 and a D2D peer ID 2 may be respectively assigned to the device 1 and the device 2. The phone number application of the device 1 and the phone number application of the device 2 may be connected to each other, and this may be indicated by a CID 1. In addition, the e-mail address application of the device 1 and the e-mail address application of the device 2 may be connected to each other, and this may be indicated by a CID 2. The CID 1 and the CID 2 may be indicated by an LID 1.

Figure 6:
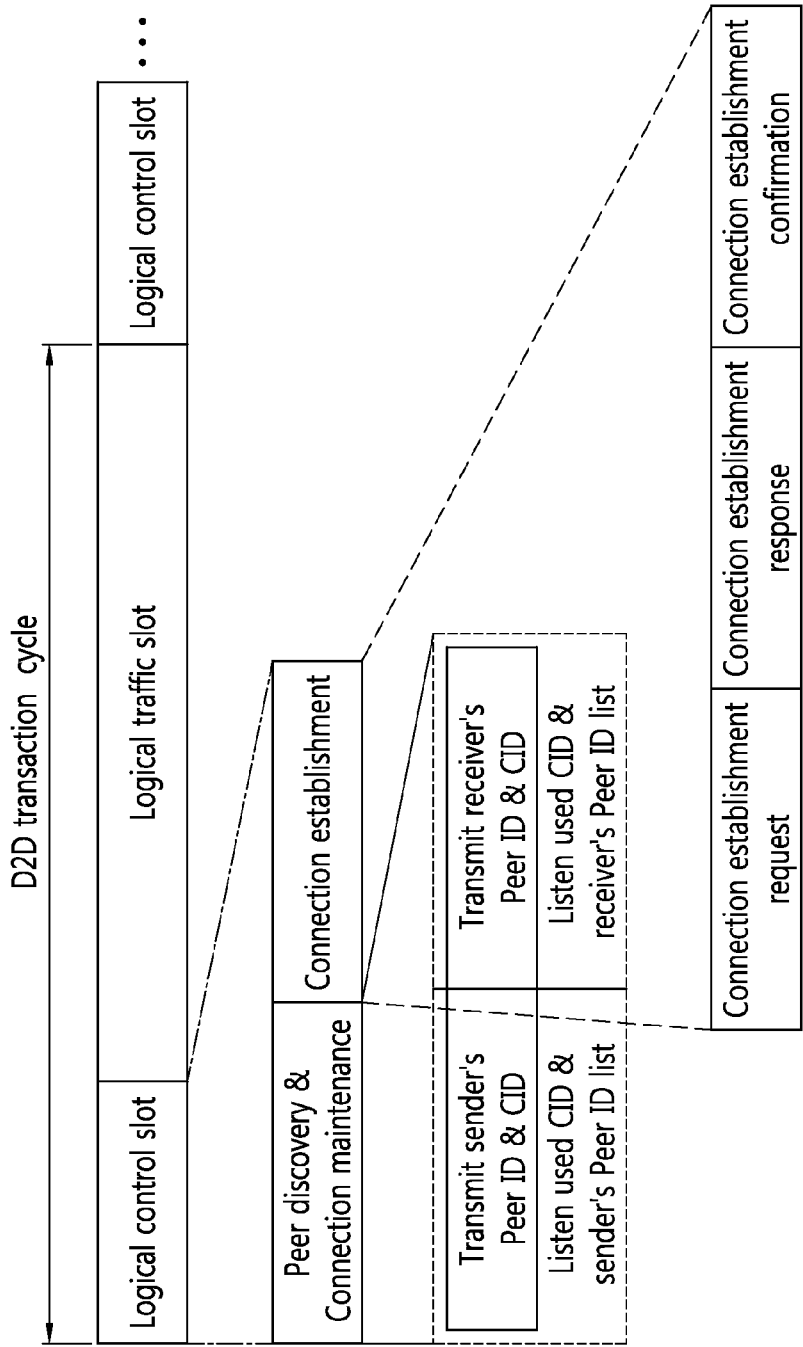
FIG. 6 shows an example of a D2D frame structure for proximity communication according to an embodiment of the present invention.

FIG. 6 shows an example of a D2D frame structure for proximity communication according to an embodiment of the present invention.

Referring to FIG. 6, a D2D frame includes a logical control slot and a logical traffic slot. A D2D transaction cycle may be defined as a duration including one logical control slot and one logical traffic slot. The logical control slot may include a peer discovery & connection maintenance area and a connection establishment area. The peer discovery & connection maintenance area may include an area for transmitting a sender's peer ID and a CID and for listening a used CID and a sender's peer ID list. In addition, the peer discovery & connection maintenance area may include an area for transmitting a receiver's peer ID and a CID and for listening a used CID and a receiver's peer ID list. A D2D connection between devices may be established via the connection establishment area. The connection establishment area may include a connection establishment request area, a connection establishment response area, and a connection establishment confirm area.

Figure 7:
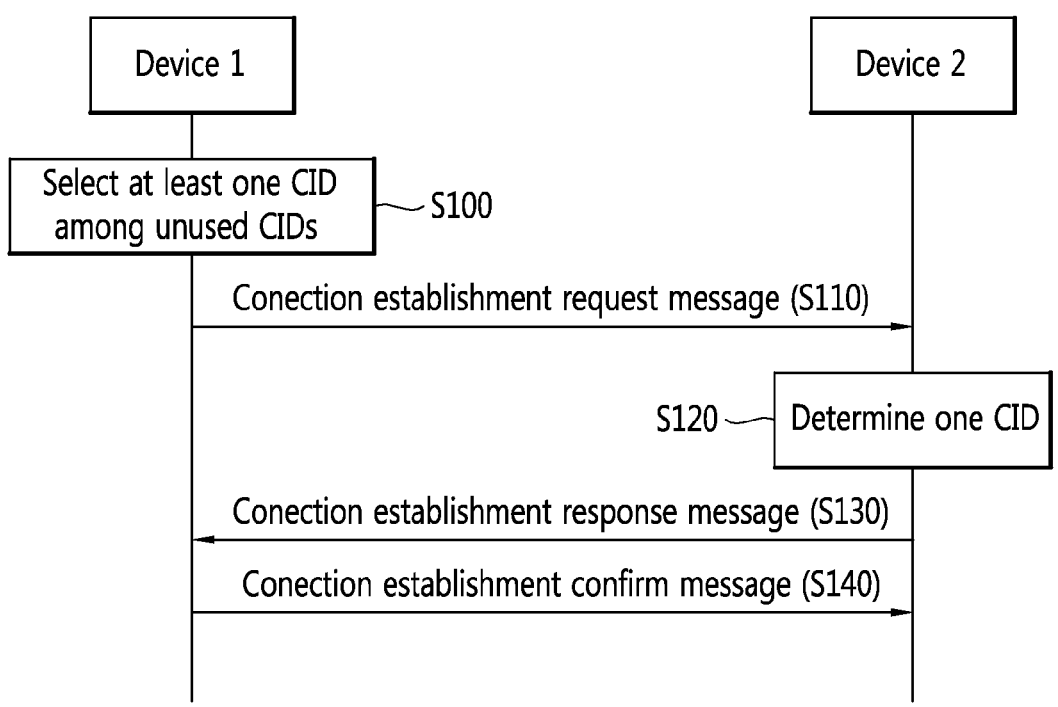
FIG. 7 shows an example of a D2D connection establishment method according to an embodiment of the present invention.

FIG. 7 shows an example of a D2D connection establishment method according to an embodiment of the present invention.

In step S100, a first device which intends to establish a connection to a second device selects one or more CIDs among the remaining unused CIDs except for a CID used by other devices. The first device may randomly select one or more CIDs among the unused CIDs. In step S110, the first device transmits a connection establishment request message to the second device. Steps S100 and S110 may be performed via a connection establishment request area in a connection establishment area of a logical control slot.

The connection establishment request message may include selected one or more CIDs, a D2D peer ID of the first device, a D2D peer ID of the second device, and a connection type between the first device and the second device. The D2D peer ID of the second device may be delivered to the first device by the network. The connection type between the first device and the second device may include unicast, multicast, broadcast, etc. If the connection type is the multicast or the broadcast, the D2D peer ID of the second device may be set to a pre-defined value which indicates an unspecific device. For example, if the second device's D2D peer ID included in the connection establishment request message is set to 0x3FF, all devices with D2D peer IDs 0x300 to 0x3FE can receive the connection establishment request message. Meanwhile, a resource and time for transmitting the connection establishment request message may be determined randomly or by using the D2D peer ID of the first device. In addition, the first device may retransmit the connection establishment request message one time or more than one time not via the connection establishment request area but via another area. This is for avoiding a loss caused by collision of transmission resources.

During the first device transmits the connection establishment request message, all of other devices may monitor whether there is a device which intends to establish a connection to the devices and whether there is a device which selects a CID identical to a CID selected and transmitted by the first device. In addition, devices which have not yet transmitted the connection establishment request message may confirm whether there is a device which has already selected and transmitted a CID identical to the CID selected by the device itself. In this process, the device may select a new CID.

The second device receives the connection establishment request message from the first device. By receiving the connection establishment request message, the second device may know that there is the first device which intends to establish a connection to the second device.

In step S120, the second device determines a single CID. The step S120 may be performed via a connection establishment response area in a connection establishment area of a logical control slot. The second device may determine the single CID by considering at least one unused CID selected by the first device (hereinafter, a first unused CID list), unused CIDs currently unused by the second device (hereinafter, a second unused CID list), and unused CIDs unused by other devices (hereinafter, a third unused CID list). For example, the second device may determine any one of CIDs not included in the third unused CID list among CIDs commonly included in the first unused CID list and the second unused CID list. Accordingly, a possibility that a plurality of devices select the same CID can be decreased. In addition, if the connection type included in the connection establishment request message is the multicast or the broadcast and one common CID is assigned to a corresponding connection, a plurality of second devices may determine a single CID selected from each of the first unused CID list, the second unused CID list, and the third unused CID list or an unused CID corresponding to the combination thereof according to a pre-defined rule. In this case, the pre-defined rule may be a CID having a maximum value or a minimum value.

In step S130, the second device transmits a connection establishment response message to the first device. The connection establishment response message may be transmitted via the connection establishment response area in the connection establishment area of the logical control slot. The connection establishment response message may include the D2D peer ID of the second device, the second unused CID list, the D2D peer ID of the first device, and the determined single CID.

A resource and time for transmitting the connection establishment request message may be determined randomly or by using a D2D peer ID of the second device. However, if the second device cannot determine a proper CID or the second device does not accept a connection establishment request of the first device, the second device may not transmit the connection establishment response message to the first device. In addition, all devices which request the connection establishment may monitor whether there is a device which selects a CID identical to the determined CID.

If the first device normally receives the connection establishment response message, the first device determines whether there are other devices which select a CID identical to the single CID determined by the second device. If there is no other device which selects the CID identical to the single CID determined by the second device, the first device transmits a connection establishment confirm message to the second device in step S140. The connection establishment confirm message may be transmitted via a connection establishment confirm area in a connection establishment area of a logical control slot. The connection establishment confirm message may include the single CID determined by the second device. A resource and time for transmitting the connection establishment response message may be determined randomly or by using a D2D peer ID of the second device.

If there are other devices which select the CID identical to the single CID determined by the second device, the first device may not transmit the connection establishment confirm message to the second device. Alternatively, the first device newly determines a single CID on the basis of the first unused CID list of the first device, the second unused CID list received through the connection establishment response message, and a CID newly occupied by other devices in the connection establishment response procedure. The first device may transmit the connection establishment confirm message including the newly determined CID to the second device. Alternatively, if there are a plurality of devices which select the same CID, some devices may transmit the connection establishment confirm message by re-determining the CID, and some devices may not transmit the connection establishment confirm message.

In addition, if the connection type is the multicast or the broadcast, the first device may transmit the connection establishment confirm message only to some of devices which transmit the connection establishment response message. The second device which receives the connection establishment confirm message may determine that the connection establishment is complete.

Meanwhile, if scheduling transmitted in the logical traffic slot of the D2D frame, i.e., a response for a transmission request of user data, is not received from the second device, the first device may determine that the second device fails to normally receive the connection establishment confirm message. Therefore, the first device may re-request the connection establishment to the second device.

Hereinafter, CID collision and CID reconfiguration based on the aforementioned D2D connection establishment method will be described according to various embodiments.

Figure 8:
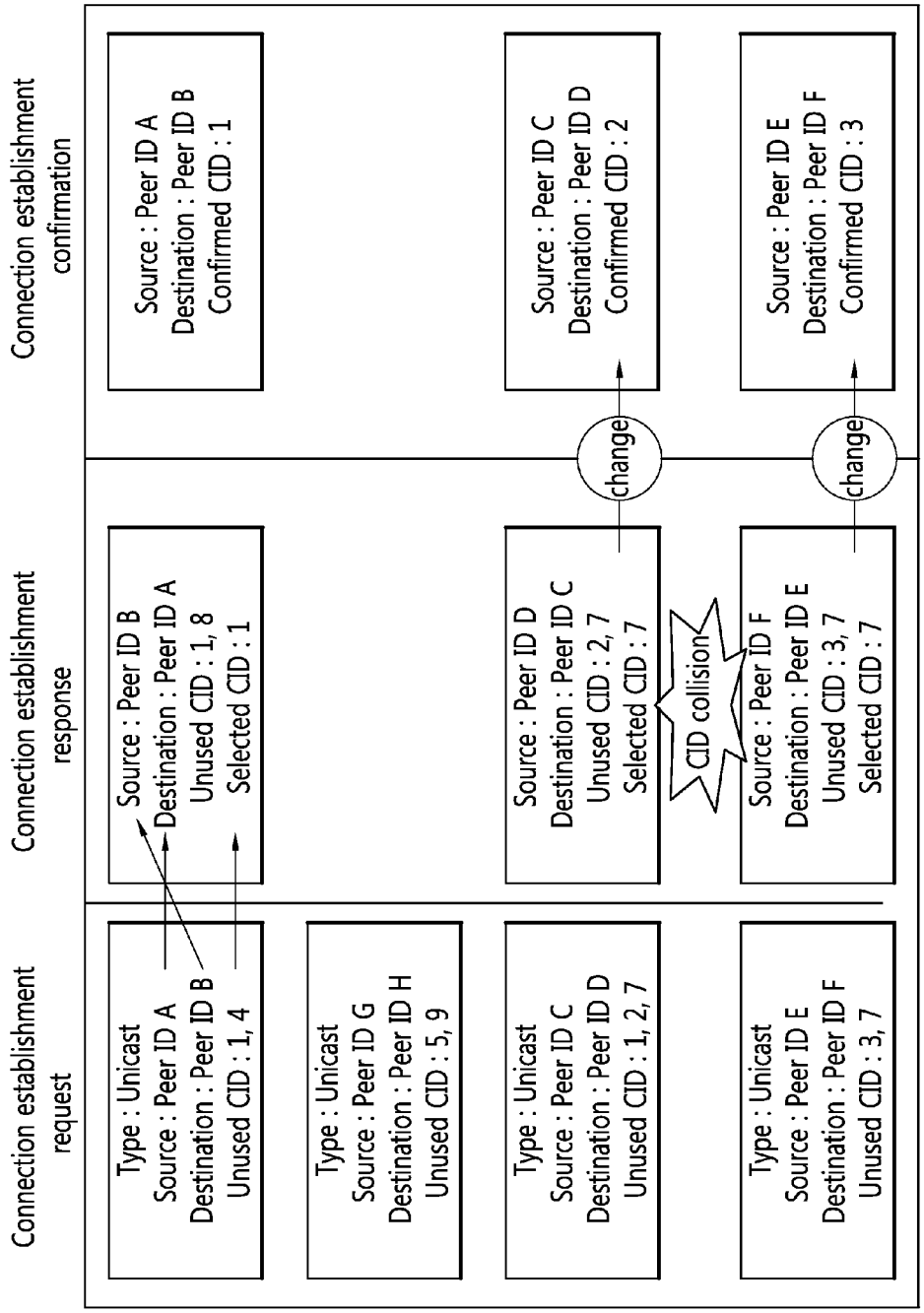
FIG. 8 shows an example of an assigned CID according to an embodiment of the present invention.

FIG. 8 shows an example of an assigned CID according to an embodiment of the present invention. The embodiment of FIG. 8 shows a case in which devices establish a D2D connection in a unicast manner.

Referring to FIG. 8, a device A having a D2D peer ID A intends to establish a D2D connection to a device B having a D2D peer ID B. CIDs 1 and 4 are unused CIDs of the device A. A device G having a D2D peer ID G intends to establish a D2D connection to a device H having a D2D peer ID H. CIDs 5 and 9 are unused CIDs of the device G. A device C having a D2D peer ID C intends to establish a D2D connection to a device D having a D2D peer ID D. CIDs 1, 2, and 7 are unused CIDs of the device C. A device E having a D2D peer ID E intends to establish a D2D connection to a device F having a D2D peer ID F. CIDs 3 and 7 are unused CIDs of the device E. The devices A, G, C, and E transmit a connection establishment request message including a D2D peer ID of each of the devices and a target device and an unused CID of each of the devices to a device to which each device intends to establish a connection in a connection establishment request area.

Among devices to which the devices A, G, C, and E intend to establish a connection, the devices B, D, and F receive the connection establishment request message. CIDs 1 and 8 are unused CIDs of the device B. The device B selects a CID 1 which is an intersection of the unused CID of the device A and the unused CID of the device B. CIDs 2 and 7 are unused CIDs of the device D. The device D selects the CID 7 which is one of intersections of the unused CID of the device C and the unused CID of the device D. CIDs 3 and 7 are unused CIDs of the device F. The device F selects the CID 7 which is one of intersections of the unused CID of the device E and the unused CID of the device F. The devices B, D, and F transmit a connection establishment response message including a D2D peer ID of each of the devices and a target device and an unused CID of each of the devices to a device which requests a connection to the devices in a connection establishment response area.

The devices A, C, and E receive the connection establishment response message. As a result of monitoring performed in the connection establishment response procedure, the device A can know that the CID 1 determined by the device B is unused by other devices, and thus the device A may finally determine the CID 1. The device A transmits a connection establishment confirm message including the determined CDI 1 to the device B.

On the other hand, as the result of the monitoring performed in the connection establishment response procedure, the device C can know that the device F, i.e., a destination device of the device E, determines the CID 7, and likewise, the device E can know that the device D, i.e., a destination device of the device C, also determines the CID 7. That is, collision occurs in the determined CID. Accordingly, the device C finally determines not the CID 7 but the CID 2, and the device E also finally determines not the CID 7 but the CID 3. The device C transmits a connection establishment confirm message including the determined CID 2 to the device D, and the device E transmits a connection establishment confirm message including the determined CID 3 to the device F. This is a case in which all of devices of which CIDs collide re-determine the CIDs.

Figure 9:
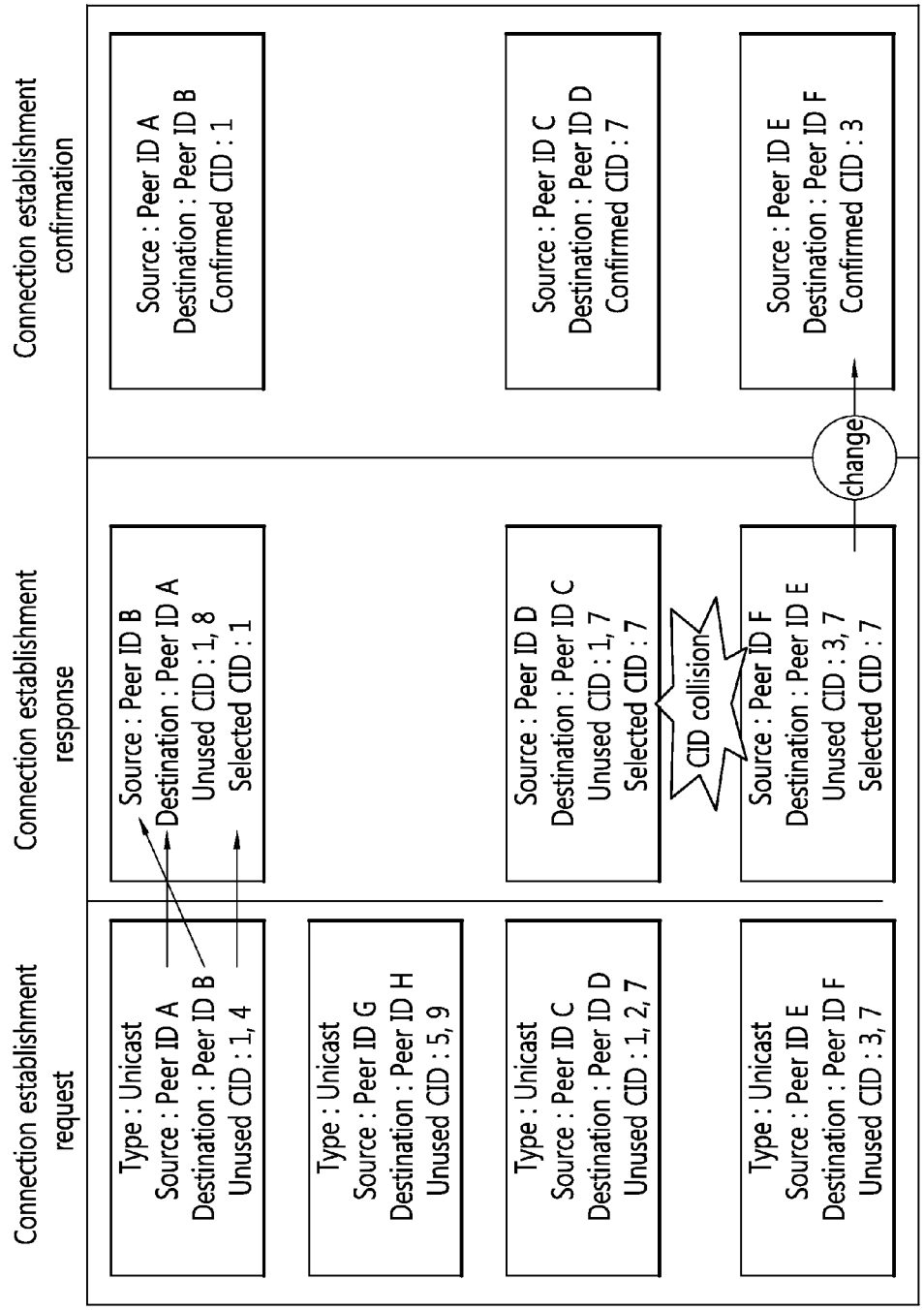
FIG. 9 shows another example of an assigned CID according to an embodiment of the present invention.

FIG. 9 shows another example of an assigned CID according to an embodiment of the present invention.

The embodiment of FIG. 9 is identical to the embodiment of FIG. 8 in that each device's D2D peer ID and each device's unused CID list are the same and also in that the CID 7 determined by the device D collides with the CID 7 determined by the device F. However, the embodiment of FIG. 9 differs from the embodiment of FIG. 8 in that only the device E changes the collided CID among the devices of which CIDs collide. That is, the device C finally determines the collided CID 7, and the device E finally determines not the CID 7 but the CID 3. This shows a case in which only some of the devices of which CIDs collide re-determine the CIDs.

Figure 10:
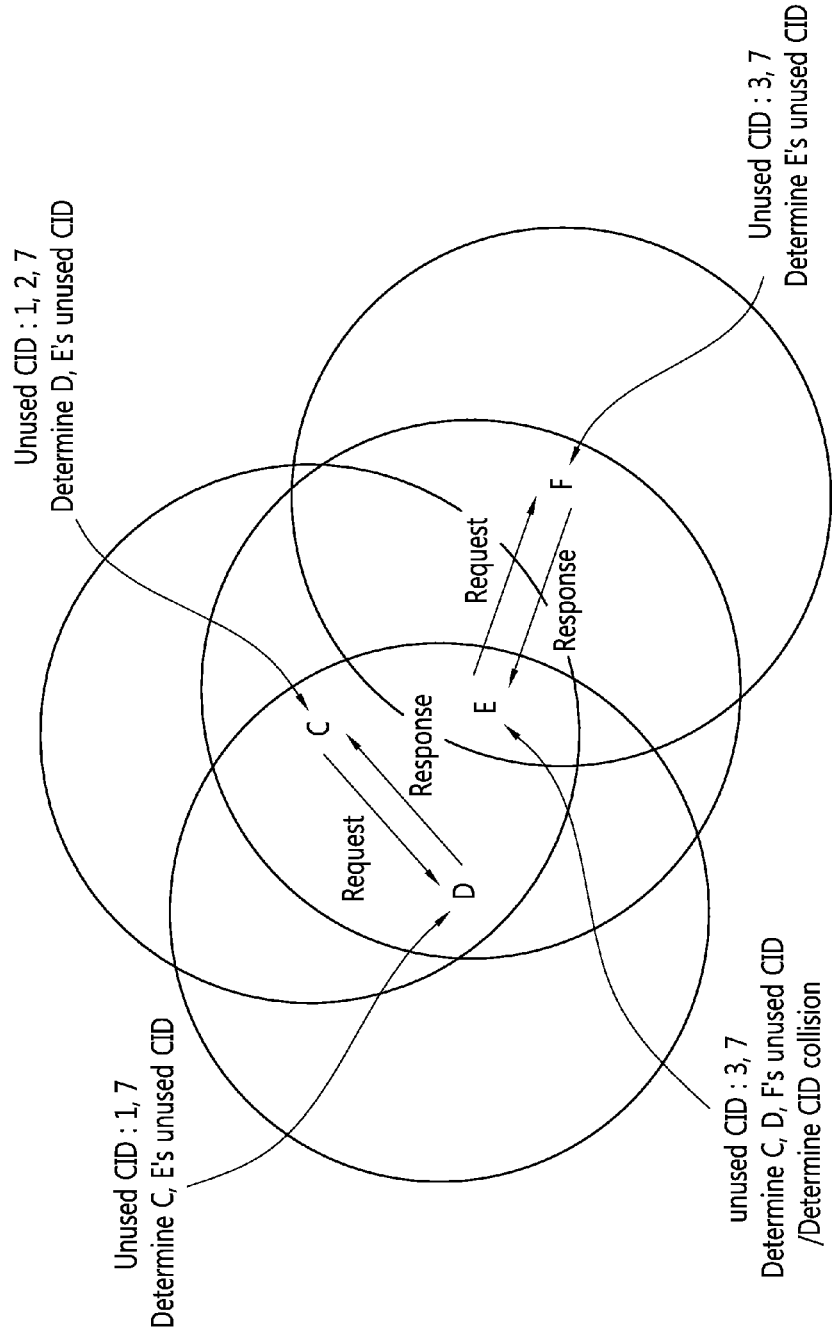
FIG. 10 shows another example of an assigned CID according to an embodiment of the present invention.

FIG. 10 shows another example of an assigned CID according to an embodiment of the present invention. A relationship of the devices C, D, E, and F of FIG. 9 is shown in FIG. 10.

Referring to FIG. 10, CIDs 1, 2, and 7 are unused CIDs of the device C, and the device C recognizes unused CIDs of the devices D and E. CIDs 1 and 7 are the unused CIDs of the device D, and the device D recognizes the unused CIDs of the devices C and E. Accordingly, the device C and the device D can finally determine the CID 7. In addition, CIDs 3 and 7 are the unused CIDs of the device E, and the device E recognizes the unused CIDs of the devices C, D, and F. CIDs 3 and 7 are unused CIDs of the device F, and the device F recognizes the unused CID of the device E. The device E determines whether CID collision occurs, and thus the device E and the device F can finally determine the CID 3.

Figure 11:
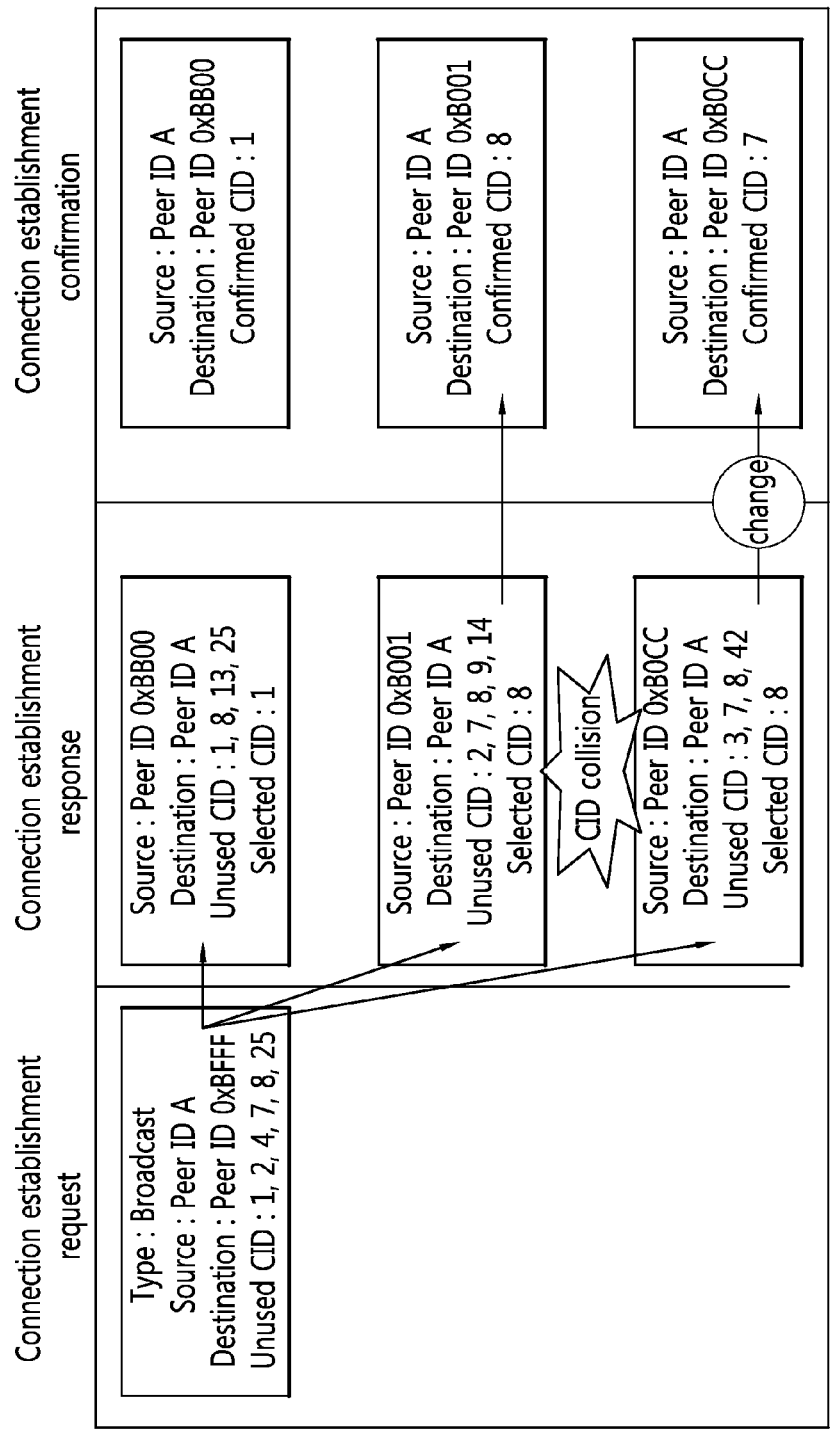
FIG. 11 shows another example of an assigned CID according to an embodiment of the present invention.

FIG. 11 shows another example of an assigned CID according to an embodiment of the present invention. The embodiment of FIG. 11 shows a case in which one device establishes a D2D connection in a broadcast manner, and a CID is assigned individually for each connection.

Referring to FIG. 11, a device A having a D2D peer ID A intends to establish a D2D connection to a plurality of devices in a broadcast manner. CIDs 1, 2, 4, 7, 8, and 25 are unused CIDs of the device A. The device A transmits a connection establishment request message including a D2D peer ID of each of the devices and a target device and an unused CID of each of the devices in a connection establishment request area. It is assumed in FIG. 11 that the target device's D2D peer ID determined by the device A is set to 0xBFFF. That is, D2D peer IDs of devices to which the device A intends to establish a connection may be 0xB000~0xBFFE.

Among the devices to which the device A intends to establish the connection, devices of which D2D peer IDs are included in the range of 0xB000 to 0xBFFE receive a connection establishment request message. CIDs 1, 8, 13, and 25 are unused CIDs of the device 0xBB00. The device 0xBB00 selects a CID 1 which is one of intersections of the unused CID of the device A and the unused CID of the device 0xBB00. CIDs 2, 7, 8, 9, and 14 are unused CIDs of the device 0xB001. The device 0xB001 selects a CID 8 which is one of intersections of the unused CID of the device A and the unused CID of the device 0xB001. CIDs 3, 7, 8, and 42 are unused CIDs of the device 0xB0CC. The device 0xB0CC selects a CID 8 which is one of intersections of the unused CID of the device A and the unused CID of the device 0xB0CC. The devices 0xBB00, 0xB001 and 0xB0CC transmit a connection establishment response message including a D2D peer ID of each of the devices and a target device and an unused CID of each of the devices to the device A in a connection establishment response area.

The device A receives the connection establishment response message transmitted from a plurality of devices. The device A can know that the CID 1 determined by the device 0xBB00 is unused by other devices, and thus the device A can finally determine the CID 1. The device A transmits a connection establishment confirm message including the CID 1 determined by the device 0xBB00.

On the other hand, the device A can know that the CID 8 determined by the device 0xB001 collides with the CID 8 determined by the device 0xB0CC. Accordingly, the device A finally determines the CID 8 for the device 0xB001, and finally determines not the CID 8 but the CID 7 for the device 0xB001. The device A transmits a connection establishment confirm message including the CID 8 determined by the device 0xB001, and also transmits a connection establishment confirm message including the CID 7 determined by the device 0xB0CC. This shows a case in which the CID is assigned individually for each connection, and some CIDs are re-determined when CID collision occurs.

Figure 12:
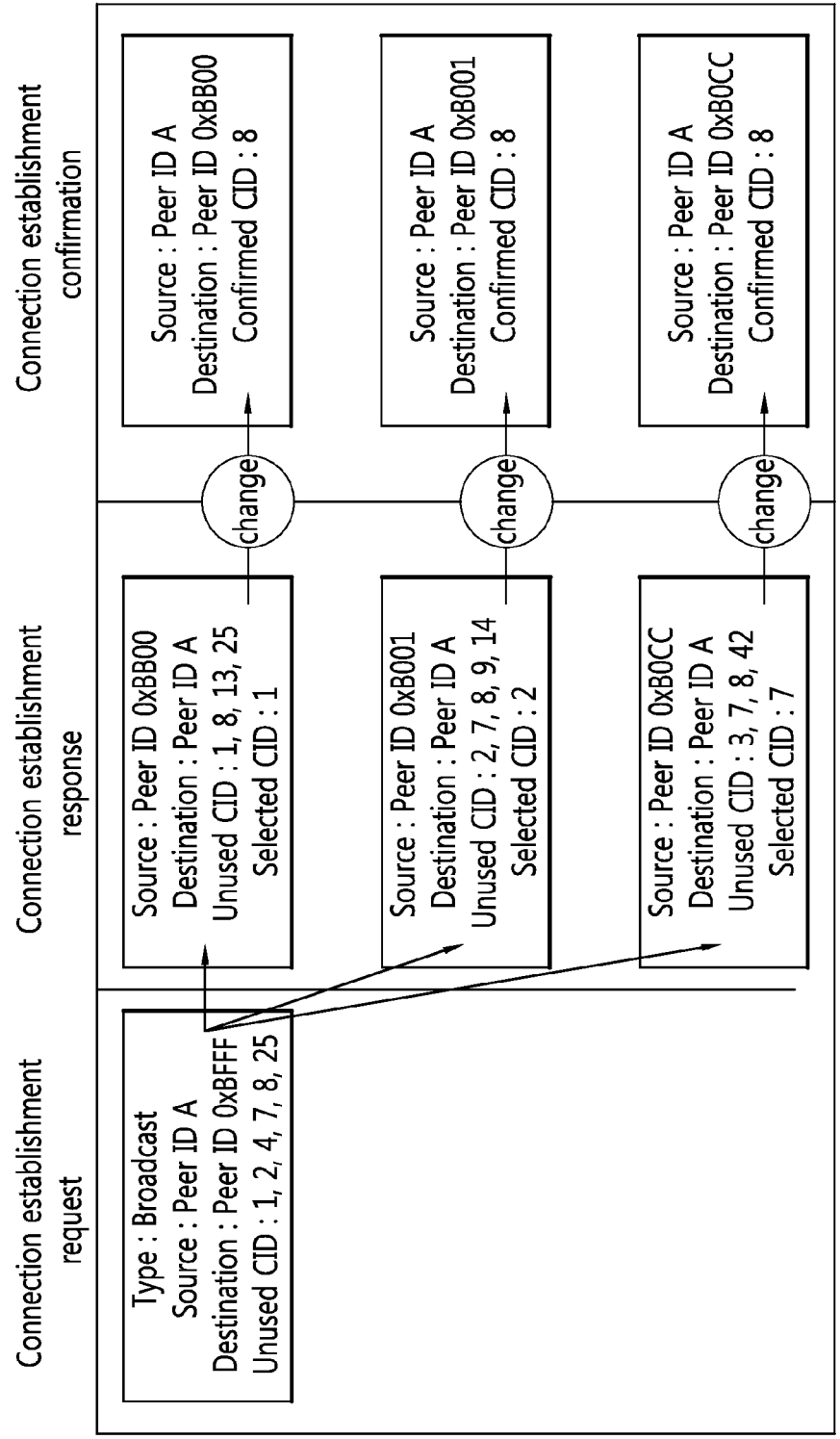
FIG. 12 shows another example of an assigned CID according to an embodiment of the present invention.

FIG. 12 shows another example of an assigned CID according to an embodiment of the present invention. The embodiment of FIG. 12 shows a case in which one device establishes a D2D connection in a broadcast manner, and a CID is assigned commonly to a plurality of connections.

Referring to FIG. 12, a device A having a D2D peer ID A intends to establish a D2D connection to a plurality of devices in a broadcast manner. CIDs 1, 2, 4, 7, 8, and 25 are unused CIDs of the device A. The device A transmits a connection establishment request message including a D2D peer ID of each of the devices and a target device and an unused CID of each of the devices in a connection establishment request area. It is assumed in FIG. 12 that the target device's D2D peer ID determined by the device A is set to 0xBFFF. That is, D2D peer IDs of devices to which the device A intends to establish a connection may be 0xB000~0xBFFE.

Among the devices to which the device A intends to establish the connection, devices of which D2D peer IDs are included in the range of 0xB000 to 0xBFFE receive a connection establishment request message. CIDs 1, 8, 13, and 25 are unused CIDs of the device 0xBB00. The device 0xBB00 selects a CID 1 which is one of intersections of the unused CID of the device A and the unused CID of the device 0xBB00. CIDs 2, 7, 8, 9, and 14 are unused CIDs of the device 0xB001. The device 0xB001 selects a CID 2 which is one of intersections of the unused CID of the device A and the unused CID of the device 0xB001. CIDs 3, 7, 8, and 42 are unused CIDs of the device 0xB0CC. The device 0xB0CC selects a CID 7 which is one of intersections of the unused CID of the device A and the unused CID of the device 0xB0CC. The devices 0xBB00, 0xB001 and 0xB0CC transmit a connection establishment response message including a D2D peer ID of each of the devices and a target device and an unused CID of each of the devices to the device A in a connection establishment response area.

The device A receives the connection establishment response message transmitted from a plurality of devices. The device A changes the determined unused CID which is common to the device 0xBB00, the device 0xB001, and the device 0xB0CC to the CID 8 in the connection establishment response message transmitted by each device. Accordingly, the common CID can be assigned to all connections. The device A transmits a connection establishment confirm message including the CID 8 determined by the device 0xBB00, the device 0xB001, and the device 0xB0CC.

Figure 13:
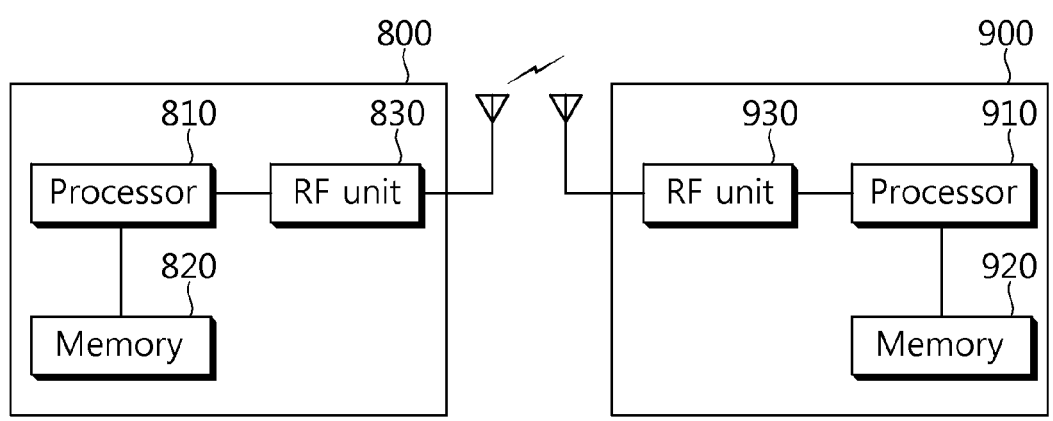
FIG. 13 is a block diagram showing wireless communication system to implement an embodiment of the present invention.

FIG. 13 is a block diagram showing wireless communication system to implement an embodiment of the present invention.

A first device 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A second device 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for establishing, by a first device, a device-to-device (D2D) connection between the first device and a second device in a wireless communication system, the method comprising:

selecting at least one connection identifier (CID) among first CIDs unused by the first device and a third device;

transmitting, to the second device, a connection establishment request message including the selected at least one CID, a D2D peer ID of the first device, a D2D peer ID of the second device, and a connection type between the first device and the second device;

receiving, from the second device, a connection establishment response message including the D2D peer ID of the first device, the D2D peer ID of the second device, second CIDs unused by the second device, and a third CID selected by the second device, wherein the third CID is selected as one CID of a intersection of the selected at least one CID and the second CIDs; and checking whether the third CID collides with a fourth CID selected by the third device;

if the third CID does not collide with the fourth CID, determining the third CID to confirm the D2D connection, and if the third CID collides with the fourth CID, determining a fifth CID which is another CID of the intersection of the selected at least one CID and the second CIDs to confirm the D2D connection; and if the third CID does not collide with the fourth CID, transmitting, to the second device, a connection establishment confirm message including the third CID, and if the third CID collides with the fourth CID, transmitting, to the second device, a connection establishment confirm message including the fifth CID.

2. The method of claim 1, wherein the third CID and the fifth CID are different.

3. The method of claim 2, wherein the fifth CID is determined based on the at least one CID selected by the first device, the second CIDs, and CIDs occupied by the third devices.

4. The method of claim 1, wherein the connection type between the first device and the second device is one of unicast, multicast or broadcast.

5. The method of claim 4, wherein if the connection type between the first device and the second device is multicast or broadcast, the D2D peer ID of the second device is set to a pre-defined value indicating unspecific devices.

6. The method of claim 1, wherein the D2D peer ID of the second device is acquired from a network.

7. The method of claim 1, wherein the third CID is determined by the second device based on the at least one CID selected by the first device, the second CDs, and CIDs unused by the third devices.

8. The method of claim 1, wherein the connection establishment request message is transmitted in a connection establishment request area in a logical control slot.

9. The method of claim 1, wherein the connection establishment response message is transmitted in a connection establishment response area in a logical control slot.

10. The method of claim 1, wherein the connection establishment confirm message is transmitted in a connection establishment confirm area in a logical control slot.

* * * * *